United States Patent [19]

Morse et al.

[11] Patent Number: 4,638,652
[45] Date of Patent: Jan. 27, 1987

[54] SEALING CAP

[75] Inventors: Milton Morse, Fort Lee; John Morris, Oakland, both of N.J.

[73] Assignee: Nena Morse, Fort Lee, N.J.

[21] Appl. No.: 525,442

[22] Filed: Aug. 22, 1983

[51] Int. Cl.$^4$ .............................................. E05B 17/18
[52] U.S. Cl. ........................................ 70/454; 70/455
[58] Field of Search ................... 70/455, 454, 423–428, 70/DIG. 56

[56] References Cited

U.S. PATENT DOCUMENTS

| | | | |
|---|---|---|---|
| 1,405,368 | 1/1922 | Warren | 70/455 |
| 1,846,078 | 2/1932 | Behrendt | 70/424 |
| 1,886,271 | 11/1932 | Hoke et al. | 411/534 X |
| 2,076,004 | 4/1937 | Ringseis | 70/455 |
| 2,261,472 | 11/1941 | Hurd | 70/455 |
| 2,874,563 | 2/1959 | Schlage | 70/455 |
| 2,988,910 | 6/1961 | Eshbaugh et al. | 70/173 |
| 3,263,463 | 8/1966 | Duval et al. | 70/455 |
| 3,267,707 | 8/1966 | Adams | 70/455 |
| 3,400,564 | 9/1968 | Glass et al. | 70/455 |
| 3,475,934 | 11/1969 | Reisner | 70/455 |
| 3,627,334 | 12/1971 | Reddy | 411/542 x |
| 3,742,808 | 7/1973 | Trembley | 411/432 |

FOREIGN PATENT DOCUMENTS 1118050 11/1961 Fed. Rep. of Germany ........ 70/455
1780397 12/1971 Fed. Rep. of Germany ........ 70/455
810310  3/1959 United Kingdom ................. 70/454

Primary Examiner—Robert L. Wolfe
Assistant Examiner—Lloyd A. Gall
Attorney, Agent, or Firm—Edward R. Weingram

[57] ABSTRACT

A sealing cap is provided for a lock having a key receiving passage therein. The sealing cap comprises a sealing member which overlies the passage. The sealing member has a first slit therein extending from the outer surface of the sealing member to about the midline thereof at a first oblique angle. A second slit extends from the midline of the member to the inner surface of the member at a second oblique angle. The size of the slits, position of the openings at the ends of the slits and the midline, and the flexibility of the walls of the slits with respect to each other are adapted to seal the passage and permit the insertion of a key through the slits into the passage. The sealing member is sealingly mounted on the lock for rotation in unison with the key. Optionally, a key skirt is also provided which sealingly fits on the key and sealingly mates with the outer surface of the sealing member while the key is in the slit and the key receiving passage. The sealing cap of this invention provides a way for sealing out moisture, dust and other contaminants from the key receiving passage and lock mechanism, which contaminants usually result in the destruction of the lock mechanism and its function.

35 Claims, 9 Drawing Figures

SEALING CAP

DETAILED DESCRIPTION OF THE INVENTION

1. Field of the Invention

This invention relates to a seal for a lock, and more particularly to a seal for sealing out corrosive contaminants, moisture, dust and other contaminants from key operated locks and for sealing electrical key operated switches from flammable or explosive atmospheres.

2. Prior Art

Certain locks are constantly exposed to explosive atmospheres or to moisture in the form of rain, condensation, salt air, and washings with water. It is thus highly desirable to have a lock which is resistant to such environmental conditions or, opltionally, an environment resistant sealing device to apply to locks. Such a device is particularly useful in protecting ignition switches of boats, open jeeps, off-road vehicles, ski mobiles, snowmobiles, and any other vehicle with an exposed ignition switch from the harmful effects of dust, water, salt, moisture, contaminants and corrosion.

A well-known type device for covering a keyhole to protect it from the elements is a swing cover. The swing cover must be pushed aside, either manually or by the key, in order to permit insertion of the key into the lock or the key switch. In order for the key to function in the lock, the cover must be held aside in a non-sealing position. This is unsatisfactory since contaminants can enter the lock at the time when the swing cover is in the "pushed-aside" or "open" mode. Even if the lock is a "momentary" type of switch, where the key can be withdrawn from the lock immediately after actuation has been accomplished, this type of lock seal is still unsatisfactory for use in explosive or flammable atmospheres, such as grain elevators, oil refinerys, distillation plants, chemical laboratories, operating rooms, etc. It was with these problems in mind that the present invention was conceived.

Other type of sealing means are known in the art. See for example the following U.S. patents which are relevant to this art:

U.S. Pat. No. 2,076,004 to Ringseis;
U.S. Pat. No. 2,261,472 to Hurd;
U.S. Pat. No. 2,874,563 to Schlage;
U.S. Pat. No. 2,988,910 to Eshbaugh et al; and
U.S. Pat. No. 3,263,463 to Duval et al.

Generally, the most relevant of the aforementioned references, i.e. Hurd, Schlage, and Duval et al, describe complicated devices having spring mechanisms, shutters, and/or seals which are inadequate to seal moisture, dust and corrosive or explosive atmospheres out of the lock while the key is in the actuating mode.

More specifically, Hurd describes a lock of flexible yieldable material, such as rubber, mounted in a cap and held in place on the lock by the edges of a cup. A slit is provided for insertion of a key. Such a mechanism does not provide the positive sealing required to keep a lock mechanism moisture and dust free while the slot is distended by the presence of the key. Also, actuation of an electrical circuit could be extremely hazardous when a key operated switch is used in an explosive atmosphere, such as a grain elevator, an oil refinery or in the vicinity of tanks containing a flammable gas or gas delivery pipes.

Schlage describes a pair of shutter members mounted in a space inside a housing which is mounted on the lock. Such a shutter arrangement, housing and the mechanism for opening and closing the shutter are complicated.

Duval et al is also a complicated device for maintaining a seal on a lock wherein the seal assembly comprises numerous seals, housings, springs, etc. which makes the device very complicated to assemble and attach to a lock mechanism.

Ringseis, which describes a keyhole guide for guiding a key into a lock, and Eshbaugh et al, which describes a locking cap for a fill-up pipe, are of interest in that they describe devices which are attached to locks.

Thus, it is highly desirable to have a device which is simple in construction, which is easy to install and which provides a sealing means which seals the lock mechanism from moisture and dust in severe environments as on boats, jeeps, off-road vehicles, ski mobiles, snowmobiles, and other vehicles with exposed locks, for example on ignition switches.

OBJECTS AND SUMMARY OF THE INVENTION

The foregoing problems associated with prior art sealing devices for locks has been overcome by the sealing cap of this invention which includes, in one embodiment, overlapping rubber discs through which a key must pass in order to enter the lock or the key operated switch. Broadly, the sealing cap of this invention is designed for a lock having a key receiving passage therein. The sealing cap comprises a sealing member which overlies the passage. The sealing member has a first slit therein extending from the outer surface of the sealing member to about the midline thereof at a first oblique angle. A second slit extends from the midline of the sealing member to the inner surface of the member at a second oblique angle. The size of the slits, position of the openings at the ends of the slits and the midline, and the flexibility of the walls of the slits with respect to each other are adapted to seal the passage and permit the insertion of a key through the slits into the passage. A means is provided for sealingly mounting the sealing member on the lock for rotation in unison with the key.

Preferably the mounting means comprises an enclosure member adapted at one end to be threadedly mounted to the cylinder of the lock and at the other end to enclose the sealing member. A cap is provided which is adapted to engage the other end of the enclosure member and maintain the sealing member within the enclosure member. Optionally, a key skirt is also provided which sealingly fits on the key and sealingly mates with the outer surface of the sealing member while the key is in the slit and key receiving passage.

The sealing cap of this invention provides a means for sealing out moisture and dust from the key receiving passage and lock mechanism resulting in the destruction of the lock mechanism and its function.

It is an object of this invention to provide a sealing cap for a key activated electical switch which will prevent an electrical spark within the switch from igniting an explosive or flammable atmosphere in which the switch is to be actuated.

It is also an object of this invention to provide a sealing cap for a lock which provides a positive seal against moisture and dust while the key is inserted within the lock and also when the key is withdrawn from the lock.

It is a further object of this invention to provide a sealing cap for a lock which is simple in construction, inexpensive to construct, and easy to replace and install on an ignition system for a vehicle.

It is still another object of this invention to provide a novel sealing member which overlies the key receiving passage and provides a unique sealing mechanism to prevent moisture and dust from entering the key receiving passageway.

Yet another object of this invention is to provide a sealing cap for a lock which overlies the key receiving passage and is provided with a plurality of overlapping slits through which the key may be inserted for operating the lock mechanism and the sealing member so arranged and constructed that when the key is withdrawn the slits will automatically return to their overlapping position, thus sealing the lock mechanism from the environment.

Still another object of this invention is to provide a sealing cap for an ignition lock of a vehicle which can be quickly and easily used with one hand.

A further object of this invention is to provide a sealing cap for a lock which allows easy access to the keyhole while preventing dust and moisture from entering therein.

A still further object of this invention is to provide an overlapping sealed passageway for a key type of lock or switch wherein the passageway will return to the overlapping configuration when the key is removed from the lock.

These and other objects and advantages will become more apparent from the following description taken in connection with the accompanying drawings.

DETAILED DESCRIPTION OF THE INVENTION

Figure 1:
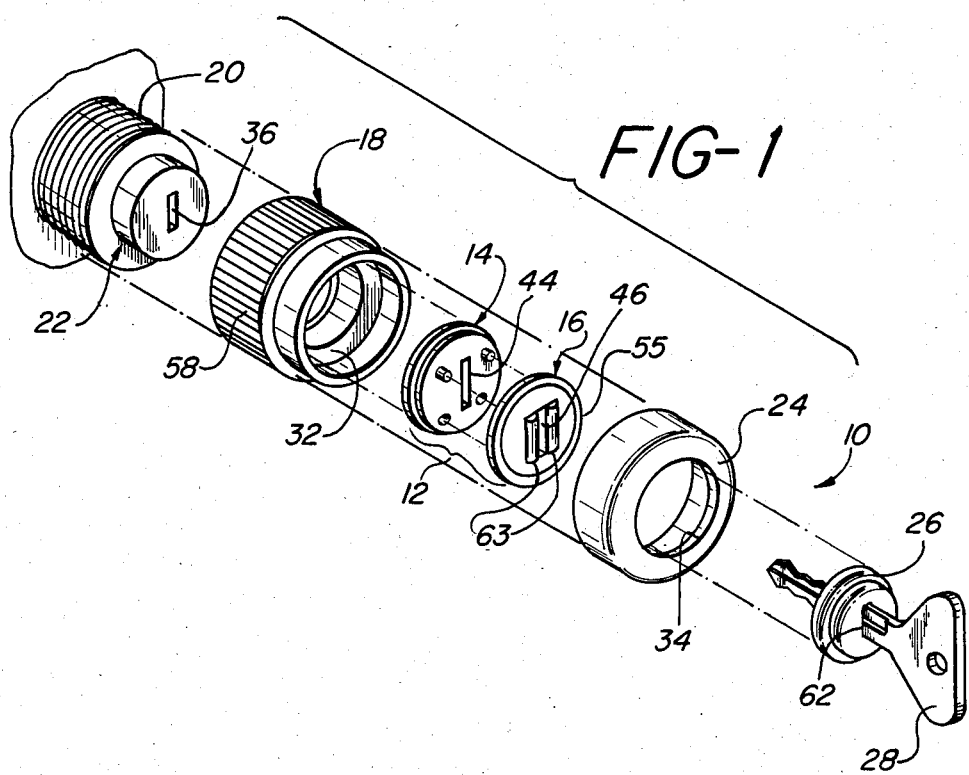
FIG. 1 is an exploded perspective view of the sealing cap and key skirt of this invention installed on an ignition lock of a vehicle.
Figure 3:
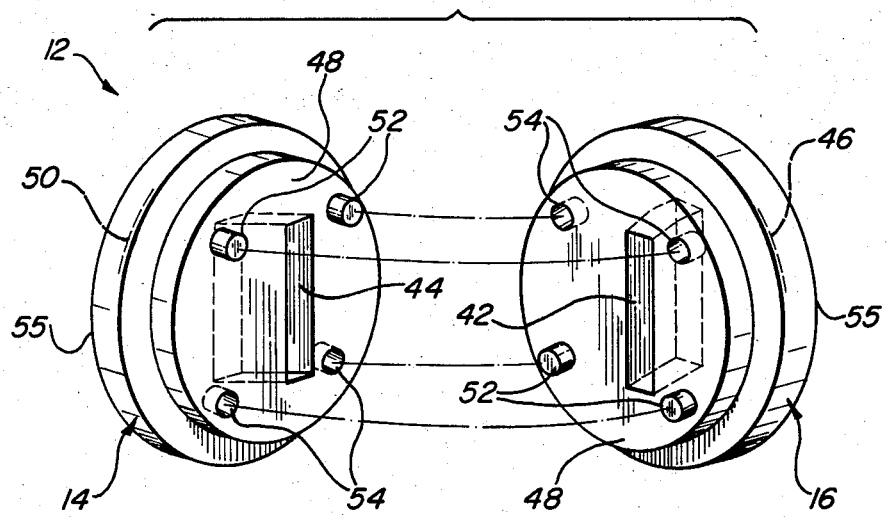
FIG. 3 is an enlarged perspective of the sealing member of this invention comprising two cover members which engagingly mate.
Figure 2:
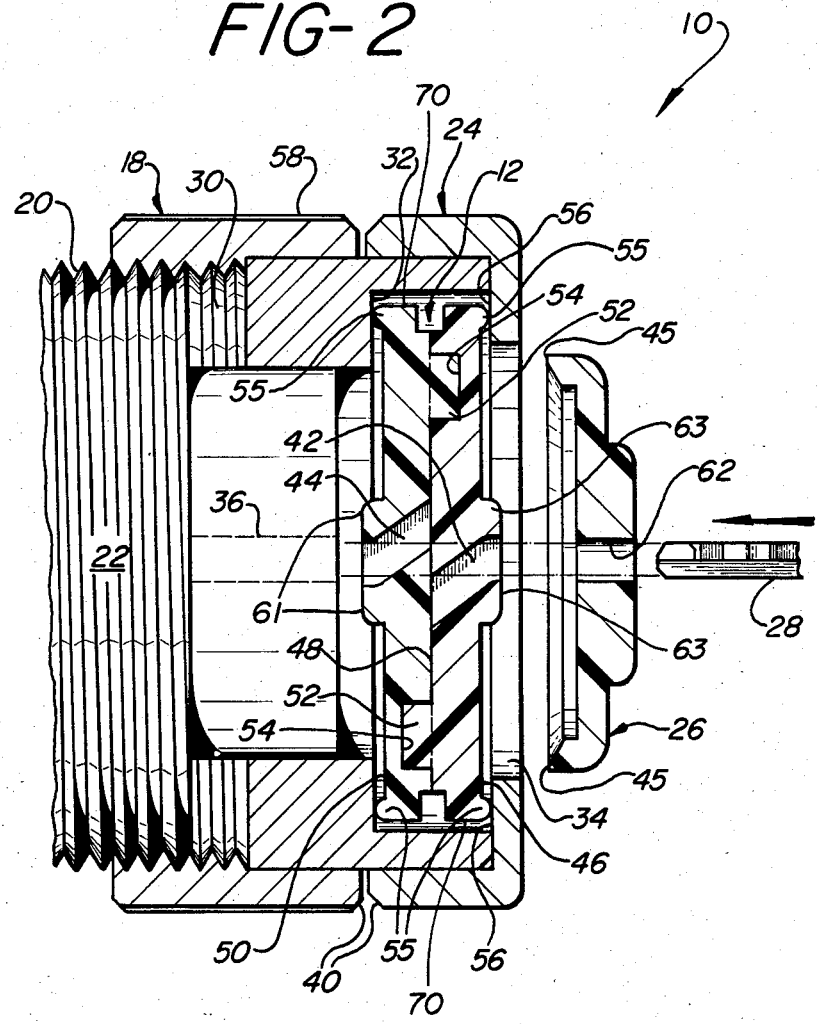
FIG. 2 is a cross-sectional view of the sealing cap of this invention mounted on an ignition lock and having a key about to be inserted therein (solid lines) and with the key therein (dashed lines).

Referring to FIGS. 1-3, the sealing cap of this invention, generally designated 10, in its preferred embodiment depicted in these Figures, comprises a circular sealing member 12 overlying key receiving passage 36. Sealing member 12 is comprised of inner and outer cover members 14, 16 which engagingly mate together; an enclosure member 18 which is adapted to be threadedly mounted to the cylinder 20 of lock 22 and adapted to enclose the sealing member 12; a cap member 24 and a key skirt means 26.

More specifically, referring to FIGS. 1 and 2, the enclosure member 18 is adapted for sealingly mounting the sealing member 12 on the lock 22 for rotation in unison with the key 28. The enclosure member 18 has at one end threads 30 which matingly engage the threads on cylinder 20 of lock 22. This threaded portion may have different type threads thereon to mate with different type cylinders of locks. The other end of member 18 is adapted to enclose sealing member 12 and yet still permit sealing member 12 to rotate with the key 28 when it is rotated in the lock 22. In order to accomplish this, the inside diameter of the enclosure member 18 shoould be slightly greater than the outside diameter of sealing member 12. A concentric ridge 32 to sealing member 12 is provided above threads 30 which permits sealing member 12 to freely slide along ridge 32 as key 28 is being turned in lock 22. The outside surface of enclosure member 18 may have a knurled surface 58 for ease of gripping.

Still referring to FIGS. 1 and 2, the enclosure member 18 is provided with a cap 24 which is adapted to engage the end of the enclosure member 18 and maintain sealing member 12 within the enclosure member 18. The cap, as depicted in FIGS. 1 and 2, is preferably a cylindrical cap whose inside diameter frictionally engages the outside diameter of the enclosure member 18. The center of cap 24 is provided with a concentric opening 34 which permits entrance of key 28 to the key receiving passage 36. The lip 56, which forms opening 34, overlaps sealing member 12 and mainfains it in the enclosure member 18. The underside of lip 56 permits relatively easy sliding of sealing member 12 so that it may turn when key 28 is turned in lock 22.

Cap 24 may be maintained on enclosure member 18 by a frictional fit between the outside diameter of enclosure member 18 and the inside diameter cap 24, however, any other means may be utilized, i.e. threads, pins, welding, etc., as long as sealing member 12 can freely rotate in unison with key 28. In the embodiment depicted, the cap 24 and enclosure member 18 are chamfered at their mating shoulders 40 to permit the placement of welding or soldering material therein to join them together. The metal is thick enough or an insulating element is provided therein (not shown) which prevents the destruction of the sealing member during welding or soldering.

An essential element of this invention is the unique sealing member 12 utilized in the sealing cap 10. As depicted in FIGS. 1-3, the sealing member 12 overlies the key receiving passage 36. The sealing member 12 has a first slit 42 therein which extends from the outer surface 46 of the sealing member 12 to about the midline 48 of member 12. A second slit 44 extends from midline 48 to the inner surface 50 of sealing member 12. Both of these slits 42, 44 extend from the outer and inner surfaces of member 12 at oblique angles thereto.

The size of the slits 42, 44, the position of the openings at the ends of the slits 42, 44 and at the midline 48, and the flexibility of the walls of the slits with respect to each other are such so that passage 36 is sealed and yet permits the insertion of a key 28 through the slits 42, 44 into the passage.

In a preferred embodiment of this invention, the oblique angles are equal to each other and generally range from about 25° to about 45° from the outer and inner surfaces 46, 50.

It is preferred for ease of manufacture and installation that sealing member 12 comprise inner and outer cover members 14, 16 which engagingly mate at their inner surfaces to form midline 48 of sealing member 12. As depicted in FIGS. 1 and 3, the preferred cover members 14, 16 are identical to each other. This permits the sealing member 12 to be constructed of identically mass-produced cover members making for ease of manufacture, and assembly.

Referring more specifically to FIG. 3, each cover member has at least one plug 52 and socket 54 (preferably two each) which is formed on the inner surface of the cover member 14, 16. Plug 52 and socket 54 matingly engage the respective socket 54 and plug 52 of another identical cover member, i.e. the plug 52 of one cover member 14 mates with the socket 54 of the other cover member 16. On the outer sides opposite the plugs 52 and sockets 54, each cover member 14, 16 is provided with cylindrical projections 61, 63 respectively formed along the sides of the openings of the slits 44, 42. The projections 63 on the outer surface 46 of sealing member 12 assists in guiding the key 28 through slits 42 and 44 and into key receiving passage 36. The projections 61 on the inner surface 50 of sealing member 12 sealingly surrounds key receiving passage 36 to assist in orienting the key for insertion into the passage.

Additionally, as shown in FIG. 3, the inner and outer surfaces 46, 50 of sealing member 12, i.e. the outer surface of each cover member 14, 16, is provided with a ridge 55 around the periphery of the member. This provides a small area upon which the sealing member 12 can slide against ridge 32 and lip 56. Ridges 55 also assist in sealing out moisture, dust, and other contaminants from key receiving passage 36.

Figure 9:
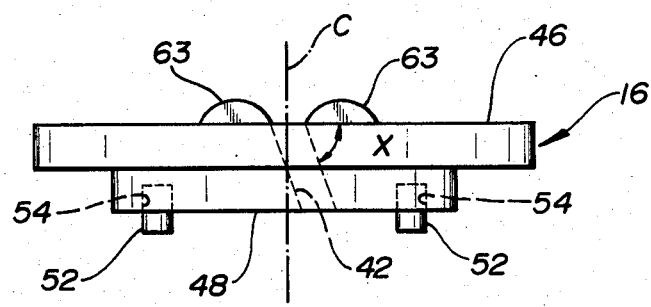
FIG. 9 is a top view of one of the cover members shown in FIG. 3.

An important aspect of this invention is the manner in which slits 42, 44 meet at the midline 48 of sealing member 12. As depicted in FIGS. 2 and 9, slit 42 starts on the outer surface 46 of sealing member 12 ssubstantially in the center thereof and goes off at an oblique angle. This is most clearly seen in FIG. 9 where centerline "C", shown as a dotted-dashed line, passes through the center of cover member 16 demonstrating that slit 42 starts on outer surface 46 substantially in the center thereof and then goes off at an oblique angle as depicted by angle "X" which, as noted earlier, is preferably in the range of from about 25° to about 45°. Likewise, slit 44 starts on the inner surface 50 substantially at the center thereof and also goes off at an oblique angle, preferably equal to the oblique angle of slit 42 and also preferably in the range of from about 25° to about 45°.

Preferably, it is desirable to provide slits wherein the openings at the midline 48 are offset from each other, wherein the key 28, when inserted in one slit 42 provides sufficient force to press the walls of that slit aside or offset the walls sufficiently so that the key may find the opening into the second slit. It may also be desirable to have the two slits meet at the midline 48 having these openings substantially coincident (not shown). This embodiment is less desirable for it does not provide the optimum seal for preventing moisture and dust from entering into the key receiving passage.

Referring to FIGS. 1 and 2, key 28 may be provided with a key skirt 26. Key skirt 26 is provided with an opening 62 in the center which sealingly fits around key 28 to prevent moisture and dust and other contaminants from entering passage 36 from around the key 28. The skirt 26 sealingly mates with outer surface 46 along lip 45 of the skirt and, thus, provides further sealing of the key receiving passage 36. In the embodiment depicted there is no contact between projection 61 and the inner surface of the skirt to permit the easy sliding of the skirt on lip 45.

Figure 4:
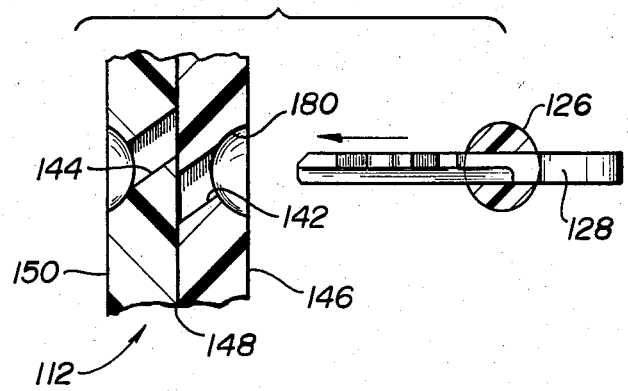
FIG. 4 is a partial cross-sectional view of another embodiment of the sealing member of this invention having a key about to be inserted therein, said key having another embodiment of a key skirt thereon.
Figure 5:
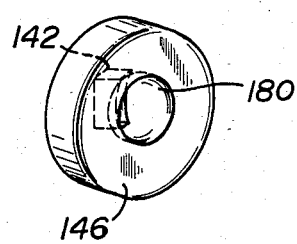
FIGS. 5 and 6 are enlarged perspectives of, respectively, a cover member and mating key skirt.
Figure 6:
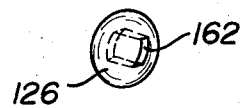

FIGS. 4 through 6 depict another embodiment of the sealing member, generally referred to herein as 112 and key skirt 126. This sealing member 112 has a first slit 142 therein which extends from the outer surface 146 of the sealing member 112 to about the midline 148 of member 112. A second slit 144 extends from midline 148 to the inner surface 150 of sealing member 112. Both of these slits 142, 144 extend from the outer and inner surfaces of member 112 at oblique angles thereto. The size of slits 142, 144, the positions of the openings at the end of the slits 142, 144 and at the midline 148 and the flexibility of the walls of the slits are as depicted in the embodiment in FIGS. 1-3, previously described.

This embodiment of the sealing member 112, however, has a generally hemispherical depression 180 therein. The key skirt 126 is of generally spherical configuration and has an opening therein 162 which sealingly fits around key 128 to prevent contaminants from entering the key mechanism. The key skirt 126 sealingly mates into the hemispherical depression 180 in sealing member 112. The hemispherical depression 180 also assists in guiding the key into the slits and key receiving passage.

Figure 7:
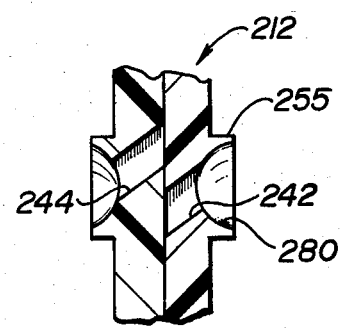
FIG. 7 is a partial cross-sectional view of another embodiment of a sealing member.
Figure 8:
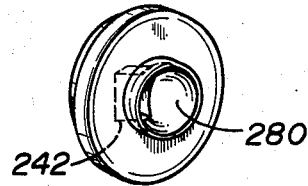
FIG. 8 is a perspective view of the sealing member of FIG. 7.

In the embodiment depicted in FIGS. 4-6, the sealing member 112 has substantially flat inner and outer surfaces 150, 146. In the embodiment depicted in FIGS. 7 and 8, the sealing member 212, besides having the aforedescribed slits 242 and 244, which function in the manner described herein, has the outer lips of the hemispherical depression 280, which mates with a spherical key skirt (not shown) similar to that shown in FIGS. 4 and 6, form a raised ridge 255. This provides a small area upon which the sealing member 212 can slide and assists in sealing out contaminants.

Referring to FIGS. 1-3, in order to use the sealing cap 10 of this invention, the enclosure member 18 is threadedly attached to the cylinder 20 of lock 22. Key 28, having key skirt 26 thereon, is inserted into slits 42, 44 and key receiving passage 36. Key skirt 26 mates swith outer surface 46 along lip 45 of the skirt. Key 28 realigns slits 42 and 44 so that they are in alignment and sealing engagement around the key 28. The key 28 is then turned and sealing member 12, comprising cover members 14 and 16, rotate with the key. The sealing members 112, 212 depicted in FIGS. 4-8 function in the same manner.

Referring to FIG. 2, it should be pointed out that projection 61 located on the inner member 14 of sealing member 12 adjacent to key receiving passage 36 plays an important role in preserving the key slit 44. The slit 44 straightens from an oblique angle to a straight passage while traversing the thickness of portion 61. This straight passage of thickness 61 acts to absorb the deformation of the material forming the oblique portion of slit 44 which deformation is produced by introducing the key into the slit 44. Without this absorbing straight section, the key would tend to press a sharp edge of the slanted slit toward the key passage 36, and if the key passage were close enough to the end of the slit, or the key was inserted with enough force, the end of the inclined slit would be pinched by the key into the key slot with resulting damage to the end of the slit, and consequent loss of sealing function.

Referring to FIG. 2, optionally, a lubricant 70 may be utilized between ridges 55 and ridge 32 and lip 56 to permit easy rotation of sealing member 112. Lubricant may also be applied on key 28 and/or slits 42 and 44 to permit easy passage of the key 28 through the misaligned slits 42, 44.

It should be noted that the present invention prevents moisture from entering the lock not only when there is no key in the lock, but also when a key is positioned in the lock.

While a specific embodiment of this invention is described and shown herein, it is to be understood that other embodiments may be resorted to without departing from the spirit and scope of the invention.

What is claimed is:

1. A cover member comprising:
    a circular member having outer and inner surfaces; and
    a slit therein extending from the outer surface to the inner surface at an oblique angle of from about 25° to 45° from the outer surface, the opening in the outer surface being substantially in the center of the surface; and
    at least one plug and socket formed on the inner surface adapted to matingly engage a similar socket and plug of another cover member.

2. The member of claim 1, wherein projections are formed on the outer surface along the sides of the opening of the slit.

3. The member of claim 2 wherein the slit extends perpendicular to the outer surface of the member while passing through the projections formed in the outer surface.

4. A sealing cap for a lock having a key-receiving passage therein, comprising:
    a sealing member overlying the passage, the sealing member having a first slit therein extending from the outer surface of the member to about the midline of the member at a first oblique angle and a second slit extending from the midline to the inner surface of the member at a second oblique angle, wherein the size of the slits, the position of the openings at the ends of the slits and the midline, and the flexibility of the walls of the slits with respect to each other are adapted to seal the passage and permit the insertion of a key through the slits into the passage; and
    a means for sealingly mounting the sealing member on the lock for rotation in unison with the key.

5. The sealing cap of claim 1 further comprising an effective amount of a lubricant on the outer and inner surfaces of the sealing member and within the slits to permit easy rotation of and passage through the sealing member.

6. The sealing cap of claim 1, wherein the first oblique angle is equal to the second oblique angle.

7. The sealing cap of claim 6, wherein the oblique angles are each from about 25° to 45° from the surfaces of the sealing member.

8. The sealing cap of claim 1, wherein the sealing member is circular and the openings at the ends of the slits on the inner and outer surfaces are substantially in the center thereof.

9. The sealing cap of claim 8, wherein the sealing member comprises two cover members which engagingly mate at their inner surfaces to form the midline.

10. The sealing cap of claim 9, wherein the cover members are identical to each other.

11. The sealing cap of claim 10, wherein each cover member has at least one plug and one socket formed in the inner surface of the cover member which matingly engages the socket and plug of the other cover member.

12. The sealing cap of claim 10, wherein both the inner and outer surfaces of the sealing member have cylindrical projections formed along the sides of the openings of the slits, the projections on the outer surface assisting in guiding the key through the slit and into the key receiving passage and the projections on the inner surface sealingly surrounding the key receiving passage.

13. The sealing cap of claim 10, wherein both the inner and outer surfaces of the sealing member have a generally hemispherical depression therein surrounding the slits, the depression assisting in guiding the key through the slit and into the key receiving passage.

14. The sealing cap of claim 13, further comprising a generally spherical key skirt means adapted to sealingly fit on the key and sealingly mate with the hemispherical depression in the outer surface of the sealing member while the key is in the slit and key receiving passage.

15. The sealing cap of claim 1, wherein the means for mounting comprises an enclosure member, one end of which is adapted to be theaddedly mounted to the cylinder of the lock and the other end of which is adapted to enclose the sealing member.

16. The sealing cap of claim 15, wherein the means for mounting includes a cap member adapted to engage the other end of the enclosure member and maintain the sealing member within the enclosure member.

17. The sealing cap of claim 16, further comprising a key skirt means adapted to sealingly fit on the key and sealingly mate with the outer surface of the sealing member while the key is in the slit and key receiving passage.

18. A sealing cap for a lock having a key receiving passage therein, comprising:
    a circular sealing member overlying the passage, the sealing member having a first slit therein, extending from the outer surface of the member to about the midline of the member at a first oblique angle and a second slit extending from the midline to the inner surface of the member at a second oblique angle equal and extending in a direction parallel to the first oblique angle, wherein the size of the slits, the position of the openings at the ends of the slits and the midline, and the flexibility of the walls of the slit with respect to each other are adapted to seal the passage and permit the insertion of a key through the slits into the passage;
    wherein the openings at the ends of the slits on the inner and outer surface of the sealing member are substantially in the center thereof; and
    means for sealingly mounting the sealing member on the lock for rotation in unison with the key, said latter means comprising:
        an enclosure member adapted at one end to be threadedly mounted to the cylinder of the lock and the other end to enclose the sealing member; and
        a cap member adapted to engage the other end of the enclosure member and maintain the sealing member within the enclosure member.

19. The sealing cap of claim 18, further comprising:
    a key skirt means adapted to sealing fit on the key and sealingly mate with the outer surface of the sealing member while the key is in the slits and key receiving passage.

20. The sealing cap of claim 18, further comprising an effective amount of a lubricant on the outer and inner surfaces of the sealing member and within the slits to permit easy rotation of and passage through the sealing member.

21. A sealing cap for a lock having a key receiving passage therein comprising:
a circular sealing member overlying the passage, comprising two identical cover members which engagingly mate at their inner surfaces to form a midline;
the sealing member having a first slit therein, extending from the outer surface of the sealing member to about the midline at a first oblique angle and a second slit extending from the midline to the inner surface of the sealing member at a second oblique angle equal and in a direction parallel to the first oblique angle, wherein the size of the slits, the position of the openings at the ends of the slits and the midline, and the flexibility of the walls of the slits with respect to each other are adapted to seal the passage and permit the insertion of a key through the slits into the passage;
wherein the openings at the ends of the slits on the inner and outer surface of the sealing member are substantially in the center thereof;
means for sealingly mounting the sealing member on the lock for rotation in unison with the key, said latter means comprising:
an enclosure member adapted at one end to be threadedly mounted to the cylinder of the lock and adapted at the other end to enclose the sealing member; and
a cap member adapted to engage the other end of the enclosure member and maintain the sealing member within the enclosure member.

22. The sealing cap of claim 21, further comprising:
a key skirt means adapted to sealingly fit on the key and sealingly mate with the outer surface of the sealing member while the key is in the slit and key receiving passage.

23. The sealing cap of claim 21, further comprising an effective amount of a lubricant on the outer and inner surfaces of the sealing member and within the slits to permit easy rotation of and passage through the sealing member.

24. A sealing cap for a lock having a key receiving passage therein comprising:
a sealing member overlying the passage, comprising two identical cover members which engagingly mate at their inner surfaces to form a midline, each cover member having at least one plug and socket formed in the inner surface which matingly engages the socket and plug of the other cover member;
the sealing member having a first slit therein, extending from the outer surface of the member to about the midline at a first oblique angle, and a second slit extending from the midline to the inner surface of the sealing member at a second oblique angle equal to the first oblique angle, wherein the size of the slits, the position of the openings at the ends of the slits and the midline, and the flexibility of the walls of the slits with respect to each other are adapted to seal the passage and permit the insertion of a key through the slits into the passage;
wherein the openings at the ends of the slits on the inner and outer surface of the sealing member are substantially in the center thereof;
means for sealingly mounting the sealing member on the lock for rotation in unison with the key, said latter means comprising:
an enclosure member adapted at one end to be threadedly mounted to the cylinder of the lock and adapted at the other end to enclose the sealing member;
a cap member adapted to engage the other end of the enclosure member and maintain the sealing member within the enclosure member; and
a key skirt means adapted to sealingly fit on the key and sealingly mate with the outer surface of the sealing member while the key is in the slit and key receiving passage.

25. The sealing cap of claim 24, wherein the inner and outer surfaces of the sealing member have projections formed along the sides of the openings of the slits, the projections on the outer surface assisting in guiding the key through the slit and into the key receiving passage and the projections on the inner surface sealingly surrounding the key receiving passage.

26. The sealing cap of claim 24, further comprising an effective amount of a lubricant on the outer and inner surfaces of sealing member and within the slits to permit easy rotation of and passage through the sealing member.

27. A sealing member adapted to overly the key receiving passage of a lock comprising a circular member having a first slit therein, extending from the outer surface of the member to about the midline of the member at a first oblique angle and a second slit extending from the midline to the inner surface of the member at a second oblique angle, wherein the size of slits, the position of the openings at the ends of the slits and the midline, and the flexibility of the walls of the slits with respect to each other are adapted to seal the passage and permit the insertion of a key through the slits into the passage.

28. The sealing member of claim 27, wherein the first oblique angle is equal and extends in a direction parallel to the second oblique angle.

29. The sealing member of claim 28, wherein the oblique angles are from about 25° to 45° from the surfaces of the sealing member.

30. The sealing member of claim 29, wherein the openings at the ends of the slits on the inner and outer surface of the sealing member are substantially in the center thereof.

31. The sealing member of claim 30, wherein the sealing member comprises two cover members which engagingly mate at their inner surfaces to form the midline.

32. The sealing member of claim 31, wherein the cover members are identical to each other.

33. The sealing member of claim 32, wherein each cover member has at least one plug and socket formed in the inner surface of the cover member which matingly engages the socket and plug of the other cover member.

34. The sealing member of claim 32, wherein the inner and outer surfaces of the sealing member have cylindrical projections formed along the sides of the openings of the slit, the projections on the outer surface assisting in guiding the key through the slit and into the key receiving passage and the projections on the inner surface sealingly surrounding the key receiving passage.

35. The sealing member of claim 32, wherein both the inner and outer surfaces of the sealing member have a generally hemispherical depression therein surrounding the slits, the depression assisting in guiding the key through the slit and into the key receiving passage.

* * * * *